US010859835B2

(12) United States Patent
Tachikawa et al.

(10) Patent No.: US 10,859,835 B2
(45) Date of Patent: *Dec. 8, 2020

(54) HEAD-MOUNTED DISPLAY APPARATUS AND METHOD FOR CONTROLLING IMAGING DATA OF HEAD-MOUNTED DISPLAY APPARATUS USING RELEASE CODE

(71) Applicant: SEIKO EPSON CORPORATION, Tokyo (JP)

(72) Inventors: Chiho Tachikawa, Ueda (JP); Fumiya Hori, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,992

(22) Filed: Jan. 23, 2019

(65) Prior Publication Data
US 2019/0227324 A1 Jul. 25, 2019

(30) Foreign Application Priority Data

Jan. 24, 2018 (JP) .................. 2018-009519

(51) Int. Cl.
*G02B 27/01* (2006.01)
*G06F 3/01* (2006.01)
(Continued)

(52) U.S. Cl.
CPC .......... *G02B 27/0172* (2013.01); *G06F 3/011* (2013.01); *G06F 3/017* (2013.01);
(Continued)

(58) Field of Classification Search
CPC ........ G02B 27/0172; G02B 2027/0178; G02B 2027/0138; G02B 2027/014; G06F 3/011; (Continued)

(56) References Cited

U.S. PATENT DOCUMENTS 7,619,657 B2 * 11/2009 Watanabe .......... H04N 1/00127
348/211.1
2005/0001024 A1 * 1/2005 Kusaka .............. H04N 1/00281
235/375
(Continued)

FOREIGN PATENT DOCUMENTS

JP 2006-164048 A 6/2006
JP 2006-208997 A 8/2006
(Continued)

OTHER PUBLICATIONS

Apr. 17, 2020 U.S. Office Action issued U.S. Appl. No. 16/212,789.

*Primary Examiner* — Darlene M Ritchie
(74) *Attorney, Agent, or Firm* — Oliff PLC

(57) ABSTRACT

A head-mounted display (HMD) includes a controller configured to follow an order of execution, execute a plurality of work blocks included in process flow data, and in accordance with settings of the process flow data regarding the work blocks, control whether use of imaging data is allowed. When one of the work blocks is disallowed to use imaging data of a camera, and the work block is executed, and when a release code is entered, the controller allows use of the imaging data. When the imaging data is used and as a result a condition set beforehand is satisfied, the controller disallows use of the imaging data of the camera.

7 Claims, 8 Drawing Sheets

(51) Int. Cl.
*H04N 1/00* (2006.01)
*G06F 1/16* (2006.01)
*H04N 1/44* (2006.01)

(52) U.S. Cl.
CPC ... *H04N 1/00875* (2013.01); *G02B 2027/014* (2013.01); *G02B 2027/0138* (2013.01); *G02B 2027/0178* (2013.01); *G06F 1/163* (2013.01); *G06F 1/1686* (2013.01); *H04N 1/442* (2013.01); *H04N 1/4413* (2013.01); *H04N 1/4433* (2013.01)

(58) Field of Classification Search
CPC ........ G06F 3/017; G06F 1/163; G06F 1/1686; H04N 1/00838; H04N 1/00875; H04N 1/442; H04N 1/4413; H04N 1/4406; H04N 1/4433
See application file for complete search history.

(56) References Cited

U.S. PATENT DOCUMENTS

| | | | | |
|---|---|---|---|---|
| 2009/0115892 | A1* | 5/2009 | Sako | H04N 1/0097 348/376 |
| 2013/0215446 | A1* | 8/2013 | Imai | H04N 1/4426 358/1.13 |
| 2014/0031001 | A1* | 1/2014 | Jacobsen | H04W 4/90 455/404.2 |
| 2014/0351896 | A1* | 11/2014 | Koo | G06F 21/10 726/4 |
| 2017/0124338 | A1* | 5/2017 | Oonishi | G06F 21/602 |
| 2017/0151034 | A1* | 6/2017 | Oda | A61B 90/361 |
| 2017/0213377 | A1 | 7/2017 | Torii et al. | |
| 2017/0277221 | A1 | 9/2017 | Degawa et al. | |
| 2018/0357870 | A1* | 12/2018 | Siminoff | G08B 13/19606 |
| 2019/0179148 | A1 | 6/2019 | Hori et al. | |
| 2020/0019234 | A1* | 1/2020 | Chehade | G05B 19/41865 |

FOREIGN PATENT DOCUMENTS

| | | | | |
|---|---|---|---|---|
| JP | 2006-319575 | A | | 11/2006 |
| JP | 2008-124885 | A | | 5/2008 |
| JP | 2014-107831 | A | | 6/2014 |
| JP | 2014107831 | A | * 6/2014 | ............. H04M 1/00 |
| JP | 5903375 | B2 | | 4/2016 |
| JP | 2016-212345 | A | | 12/2016 |
| JP | 2017-183826 | A | | 10/2017 |
| JP | 2019-105885 | A | | 6/2019 |
| WO | 2015-189994 | A1 | | 12/2015 |

* cited by examiner

HEAD-MOUNTED DISPLAY APPARATUS AND METHOD FOR CONTROLLING IMAGING DATA OF HEAD-MOUNTED DISPLAY APPARATUS USING RELEASE CODE

BACKGROUND

1. Technical Field

The invention relates to a head-mounted display apparatus and a method for controlling the head-mounted display apparatus.

2. Related Art

A head-mounted display apparatus is known that is worn on a user's head to display an image viewable by the user. The head-mounted display apparatus is provided with various functions for achieving higher functionality. Therefore, to use the head-mounted display apparatus in a work site, a measure should be taken for preventing information from leaking. In the system disclosed in JP-A-2006-319575, a hand-held terminal is allowed to read a bar-code to limit and release functions of the hand-held terminal.

If a trouble occurs in a work site, the trouble being occurred should be recorded to identify what has caused the trouble being occurred, for example. When functions of a head-mounted display apparatus being used to support operations are limited, capturing images might be limited. In this case, even when the head-mounted display apparatus is used, appropriate images might not be captured.

SUMMARY

An advantage of some aspects of the invention is to maintain security and improve convenience of a head-mounted display apparatus.

For the issues described above, a head-mounted display apparatus to be worn on a user's head, according to the invention, includes an input unit configured to accept an entry, an imaging unit configured to capture an image of outside scenery, a storage configured to store control data defining an operation flow including a plurality of operation steps for which an order of execution is predetermined, where at least any of the operation steps included in the control data include settings of whether use of imaging data of the imaging unit is allowed, and a controller configured to follow the order of execution, execute the plurality of operation steps included in the control data, and, in accordance with the settings in the control data regarding the operation steps, control whether the use of the imaging data is allowed. When one of the operation steps is disallowed to use the imaging data of the imaging unit, and the one of the operation steps is executed, and when a release code is entered through the input unit, the controller allows use of the imaging data. When the imaging data is used and as a result a condition set beforehand is satisfied, the controller disallows use of the imaging data of the imaging unit.

With this configuration, even when an operation step is disallowed to capture an image, and the operation step is executed in an operation flow, and when a release code is entered through the input unit, use of imaging data is allowed. Therefore, while maintaining security, convenience of a head-mounted display apparatus can be improved. When a condition set beforehand is satisfied, use of imaging data of the imaging unit is disallowed, thus security can be maintained.

In the invention, when the release code is entered through the input unit, and when the controller allows use of the imaging data, the controller causes the storage to store the imaging data satisfying an imaging condition entered through the input unit.

With this configuration, when use of imaging data is allowed, imaging data satisfying an imaging condition being entered is stored in the storage. Therefore, imaging data satisfying an imaging condition can be stored in the storage.

In the invention, the imaging condition includes at least one of a date and time of imaging, a location of imaging, an order of imaging, a number of images to be captured at a same location of imaging, an angle of view, and a number of pixels.

With this configuration, a date and time of imaging, a location of imaging, an order of imaging, a number of images to be captured at a same location of imaging, an angle of view, and a number of pixels of imaging data to be stored in the storage can be set.

In the invention, the release code uses at least one of text information, image information, and biological information.

With this configuration, text information, image information, and biological information can be used as a release code.

In the invention, the input unit accepts one of a password serving as the text information, a bar-code, a two-dimensional bar-code, and a QR code serving as the image information, and a face image, a retina pattern, and a fingerprint serving as the biological information as an entry of the release code.

With this configuration, one of a password, a bar-code, a two-dimensional bar-code, a QR code, a face image, a retina pattern, and a fingerprint can be used as a release code.

In the invention, the input unit accepts the imaging data as an entry, and the controller extracts code information from the imaging data accepted as the entry by the input unit, when the code information being extracted includes the release code, allows use of the imaging data, determines an allowable number of times of use of the imaging data based on the code information being extracted, and sets the determined allowable number of times of use as an upper limit to allow use of the imaging data.

With this configuration, an allowable number of times of use included in a release code can be set as an upper limit, and use of imaging data is allowed.

In the invention, the input unit accepts the imaging data as an entry, and the controller detects a gesture based on the imaging data accepted by the input unit, and, when the detected gesture corresponds to a gesture set beforehand and registered as a release code, allows use of the imaging data.

With this configuration, when a gesture set beforehand as a release code is performed, use of imaging data is allowed. Therefore, without operating the operating unit, use of imaging data is allowed with a simple operation.

In the invention, a communication unit is further included. The input unit accepts as an entry a release code received from an information processing device by the communication unit, and, when the release code accepted by the input unit corresponds to the release code set beforehand, the controller allows use of the imaging data.

With this configuration, when a release code is received from an information processing device, use of imaging data is allowed. Therefore, with an operation of an information processing device, a head-mounted display apparatus is allowed to use imaging data.

In the invention, when the release code is entered through the input unit, and when the controller allows use of the imaging data, the controller causes the storage to store the imaging data satisfying an imaging condition and received from the information processing device by the communication unit.

With this configuration, when use of imaging data is allowed, imaging data satisfying an imaging condition being set is stored in the storage. Therefore, imaging data satisfying an imaging condition can be stored in the storage.

In the invention, the imaging condition includes at least one of a date and time of imaging, a location of imaging, an order of imaging, a number of images to be captured at a same location of imaging, an angle of view, and a number of pixels.

With this configuration, a date and time of imaging, a location of imaging, an order of imaging, a number of images to be captured at a same location of imaging, an angle of view, and a number of pixels of imaging data to be stored in the storage can be set.

For the issues described above, the invention is a method for controlling a head-mounted display apparatus to be worn on a user's head. The head-mounted display apparatus includes a storage configured to store control data defining an operation flow including a plurality of operation steps for which an order of execution is predetermined, where at least any of the operation steps included in the control data includes settings of whether use of imaging data of the imaging unit is allowed, and an imaging unit configured to capture an image of outside scenery. The method includes following the order of execution, executing the plurality of operation steps included in the control data, and, in accordance with the settings in the control data regarding the operation steps, controlling whether use of the imaging data is allowed, when one of the operation steps is disallowed to use the imaging data of the imaging unit, and the one of the operation steps is executed, and when a release code is entered, allowing use of the imaging data, and, when the imaging data is used and as a result a condition set beforehand is satisfied, disallowing use of the imaging data of the imaging unit.

With this configuration, even when an operation step is disallowed to capture an image, and the operation step is executed in an operation flow, and when a release code is entered through the input unit, use of imaging data is allowed. Therefore, while maintaining security, convenience of a head-mounted display apparatus can be improved. When a condition set beforehand is satisfied, use of imaging data of the imaging unit is disallowed, thus security can be maintained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary Embodiments of the invention will now be described herein with reference to the accompanying drawings.

First Exemplary Embodiment

Figure 1:
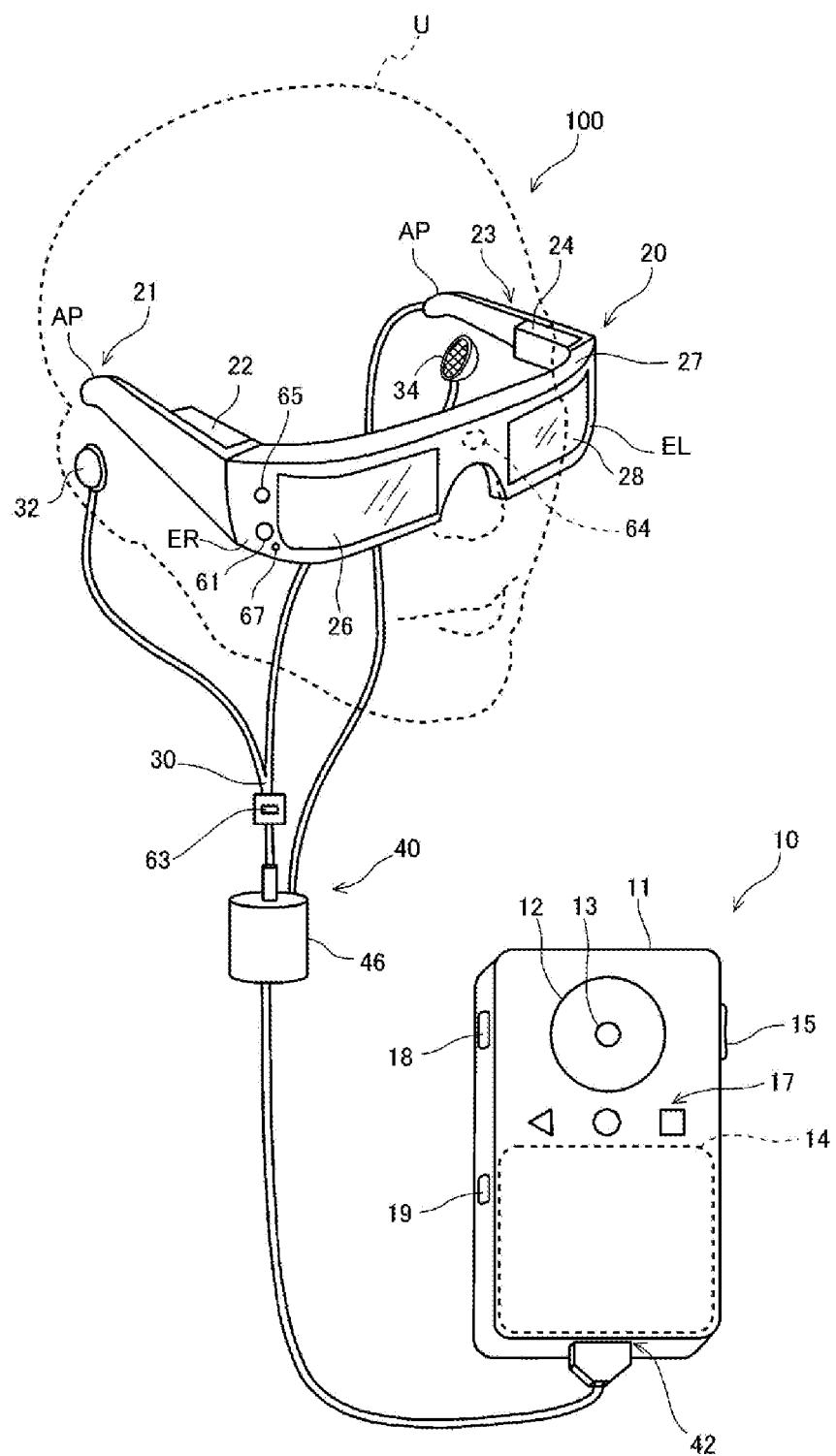
FIG. 1 is a view illustrating an external configuration of an HMD.

FIG. 1 is a view illustrating an external configuration of a head-mounted display (HMD) 100.

The HMD 100 includes an image display unit 20 and a controller 10. The image display unit 20 is to be worn on a person's head to allow the person to view a virtual image. The controller 10 also functions as an operation device used to operate the HMD 100 by a user of the HMD 100. The person wearing the image display unit 20 on the head to perform operation, for example, will be hereinafter referred to as an operator U.

The controller 10, that is, a main body 11 having a box shape, includes various switches and an operation pad 14, for example, configured to accept operations by the operator U. The image display unit 20 has an eyeglass shape in the exemplary embodiment, and includes a right holding part 21, a left holding part 23, a front frame 27, a right display unit 22, a left display unit 24, a right light-guiding plate 26, and a left light-guiding plate 28.

The right holding part 21 and the left holding part 23 extend rearward from ends of the front frame 27, respectively, to hold the image display unit 20 to the head of the operator U. One of the ends of the front frame 27 that lies on the right side of the operator U when s/he wears the image display unit 20 is referred to as an end ER, while the other one of the ends that lies on the left side is referred to as an end EL.

The right light-guiding plate 26 and the left light-guiding plate 28 are arranged in the front frame 27. While the image display unit 20 is worn, the right light-guiding plate 26 lies in front of the right eye of the operator U, while the left light-guiding plate 28 lies in front of the left eye of the operator U.

The right display unit 22 and the left display unit 24 are modules respectively formed into units having optical units and peripheral circuits and are each configured to emit imaging light. The right display unit 22 is attached to the right holding part 21, while the left display unit 24 is attached to the left holding part 23.

The right light-guiding plate 26 and the left light-guiding plate 28 are optical components made of light transmissive resin, for example. The right light-guiding plate 26 and the left light-guiding plate 28 are prisms, for example. The right light-guiding plate 26 guides imaging light output by the right display unit 22 to the right eye of the operator U, while the left light-guiding plate 28 guides imaging light output by the left display unit 24 to the left eye of the operator U. Therefore, the imaging light enters both of the eyes of the operator U. The operator U can thus view an image.

The HMD 100 is a see-through type display apparatus. The imaging light guided by the right light-guiding plate 26 and outside light passed through the right light-guiding plate 26 enter a right eye RE of the operator U. Similarly, the imaging light guided by the left light-guiding plate 28 and outside light passed through the left light-guiding plate 28 enter a left eye LE. As described above, the HMD 100 causes imaging light corresponding to an image processed internally and outside light to overlap with each other and enter the eyes of the operator U. The operator U views, through the right light-guiding plate 26 and the left light-guiding plate 28, the image formed from the imaging light and overlapped onto outside scenery.

An illuminance sensor 65 is arranged on the front frame 27 of the image display unit 20. The illuminance sensor 65 is configured to receive outside light coming from in front of the operator U wearing the image display unit 20.

A camera 61 is arranged on the front frame 27 of the image display unit 20. An imaging range and an imaging direction of the camera 61 will be described later. The camera 61 is provided at a position so that the camera 61 does not block the outside light passing through the right light-guiding plate 26 and the left light-guiding plate 28. In the example illustrated in FIG. 2, the camera 61 is arranged on the end ER of the front frame 27. However, the camera 61 may be arranged on the end EL or at the connection between the right light-guiding plate 26 and the left light-guiding plate 28. The camera 61 operates as an "imaging unit" according to the invention.

The camera 61 is a digital camera equipped with an imaging lens and an imaging element, such as a charge-coupled device (CCD) or a complementary metal oxide semiconductor (CMOS). The camera 61 according to the exemplary embodiment is a monocular camera. However, the camera 61 may be a stereo camera. The camera 61 captures an image of at least a part of outside scenery (real space) in a visual field direction of the operator U wearing the HMD 100. An angle of view of the camera 61 faces to the front of the operator U and overlaps with outside scenery viewed by the operator U through the image display unit 20. A more preferable angle of view of the camera 61 covers a whole visual field, through the image display unit 20, of the operator U. The camera 61 is configured to follow a control by a controller 150, capture an image, and output imaging data to the controller 150.

The front frame 27 is arranged with a light emitting diode (LED) indicator 67. The LED indicator 67 is arranged adjacent to the camera 61 on the end ER and configured to come on while the camera 61 is in operation in order to notify that capturing an image is in progress.

The front frame 27 is provided with a distance sensor 64. The distance sensor 64 is configured to detect a distance to an object to be measured lying in a measurement direction set beforehand. In the exemplary embodiment, the distance sensor 64 detects a distance to the object to be measured lying in front of the operator U. The distance sensor 64 may be a light reflecting type distance sensor including a light source, such as an LED or a laser diode, configured to emit light and a light receiver configured to receive light reflected by the object to be measured, for example. The distance sensor 64 may be an ultrasonic wave type distance sensor including a sound source configured to generate ultrasonic waves, and a detector configured to receive the ultrasonic waves reflected by the object to be measured. The distance sensor 64 may be a laser range scanner (range-scanning sensor). In this case, a wider region including an area in front of the image display unit 20 can be scanned.

The controller 10 and the image display unit 20 are coupled via a coupling cable 40. The coupling cable 40 is detachably coupled to a connector 42 of the main body 11.

Figure 2:
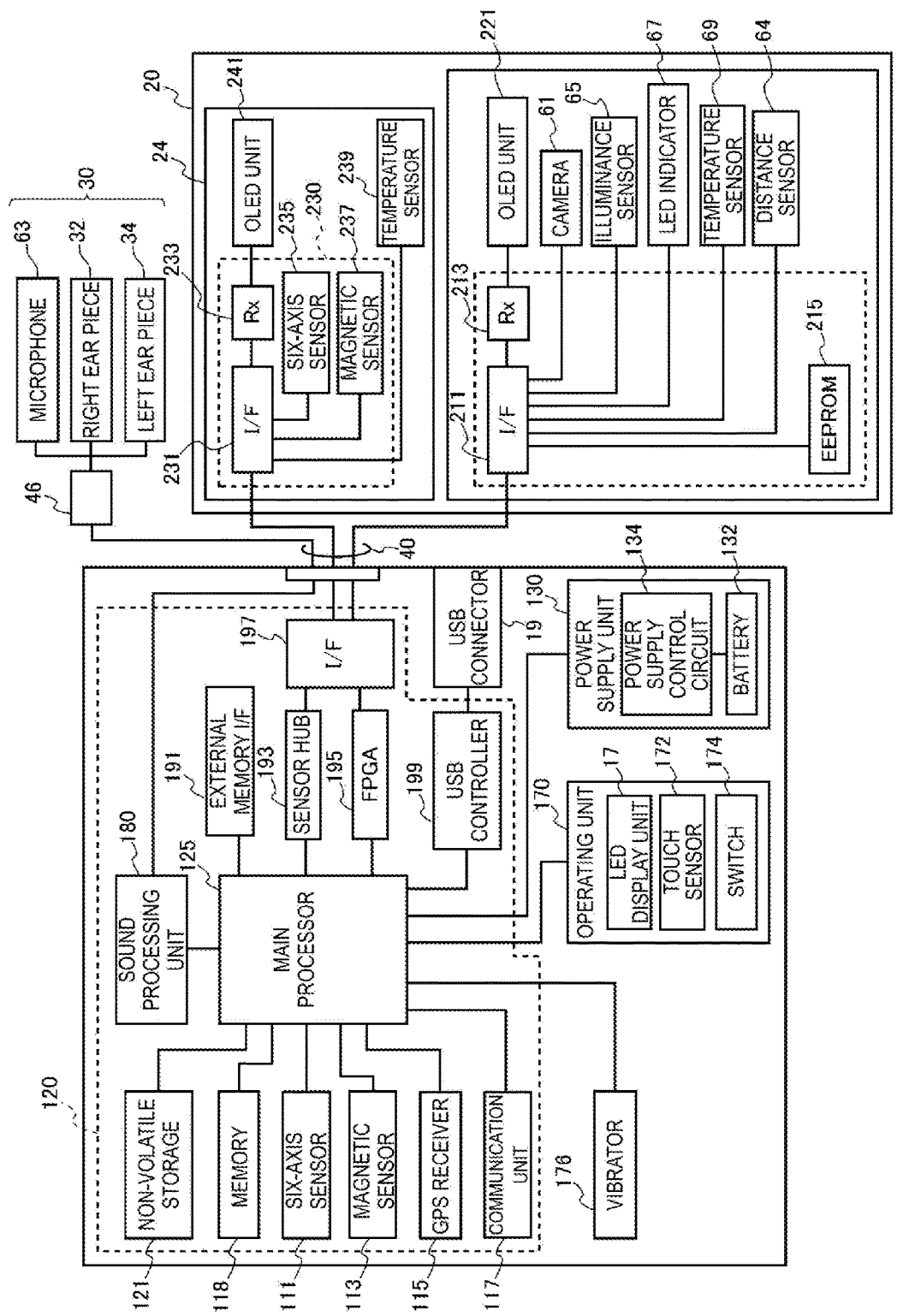
FIG. 2 is a block diagram of the HMD.

The coupling cable 40 includes an audio connector 46. The audio connector 46 is coupled to a headset 30 including a microphone 63 and a set of a right ear piece 32 and a left ear piece 34 configuring a stereo headphone. The right ear piece 32 is to be worn on the right ear of the operator U, while the left ear piece 34 is to be worn on the left ear of the operator U. The microphone 63 is configured to collect sound and output a sound signal to a sound processing unit 180 (FIG. 2). The microphone 63 may be a monaural microphone or a stereo microphone, for example, or may be a directional microphone or a non-directional microphone.

The controller 10 includes, as parts to be operated by the operator U, a wheel operating unit 12, a central key 13, the operation pad 14, an up-down key 15, an LED display unit 17, and a power switch 18. The parts to be operated are arranged on a surface of the main body 11. The parts to be operated are operated with a hand or a finger of the operator U, for example.

The operation pad 14 has an operation face configured to detect a touch operation and output an operation signal in accordance with an operation performed onto the operation face. A detection style for the operation face is not particularly limited, but may be an electrostatic style, a pressure detection style, or an optical style, for example. A touch (touch operation) onto the operation pad 14 is detected by a touch sensor (not illustrated), for example. The operation pad 14 outputs to the controller 150 a signal indicative of a position on the operation face when a touch is detected.

The main body 11 is mounted with the light emitting diode (LED) display unit 17. The LED display unit 17 includes a transmissive part (not illustrated) allowing light to pass through. As LEDs mounted immediately below the transmissive part come on, texts, symbols, and patterns, for example, formed on the transmissive part become viewable. A touch operation performed with a hand or a finger of the operator U onto the LED display unit 17 is detected by a touch sensor 172 (FIG. 2). Therefore, a combination of the LED display unit 17 and the touch sensor 172 functions as a software key.

The power switch 18 is used to turn on or off a power supply to the HMD 100. The main body 11 includes a universal serial bus (USB) connector 19 serving as an interface for coupling the controller 10 to an external device.

FIG. 2 is a block diagram illustrating a configuration of components configuring the HMD 100.

The controller 10 includes a main processor 125 configured to execute a program to control the HMD 100. The main processor 125 is coupled with a memory 118 and a non-volatile storage 121. The main processor 125 is coupled with an operating unit 170 serving as an input device. The main processor 125 is further coupled with sensors, such as a six-axis sensor 111, a magnetic sensor 113, and a global positioning system (GPS) 115.

The main processor 125 is coupled with a communication unit 117, a sound processing unit 180, an external memory interface 191, the USB connector 19, a sensor hub 193, and a field programmable gate array (FPGA) 195. The components function as interfaces to external devices.

The main processor 125 is mounted on a controller substrate 120 build into the controller 10. In the exemplary embodiment, the controller substrate 120 is mounted with the six-axis sensor 111, the magnetic sensor 113, the GPS 115, the communication unit 117, the memory 118, the non-volatile storage 121, and the sound processing unit 180, for example. The external memory interface 191, the USB connector 19, the sensor hub 193, the FPGA 195, and an interface 197 may be mounted on the controller substrate 120. The connector 42 and the USB connector 19 may further be mounted on the controller substrate 120.

The memory 118 configures a work area used to temporarily store a program to be executed by the main processor 125 and data to be processed by the main processor 125, for example. The non-volatile storage 121 includes a flash memory and an embedded multi-media card (eMMC). The non-volatile storage 121 is configured to store programs to be executed by the main processor 125 and data to be processed by the main processor 125. The memory 118 temporarily stores imaging data of the camera 61. In this case, the memory 118 operates as an input unit configured to accept the imaging data.

The operating unit 170 includes the LED display unit 17, the touch sensor 172, and a switch 174. The touch sensor 172 is configured to detect a touch operation performed by the operator U, identify a position of the operation, and output an operation signal to the main processor 125. The switch 174 is configured to output an operation signal to the main processor 125 in accordance with operations of the up-down key 15 and the power switch 18.

The switch 174 includes a button (not illustrated) used to operate a shutter of the camera 61. The LED display unit 17 is configured to follow a control by the main processor 125 to turn on or off the LEDs, as well as to cause the LEDs to blink. The operating unit 170 is a switch substrate mounted with the LED display unit 17, the touch sensor 172, the switch 174, and circuits configured to control the respective components, for example, and is accommodated in the main body 11.

The six-axis sensor 111 is an example of a motion sensor (inertial sensor) configured to detect a motion of the controller 10. The six-axis sensor 111 includes a three-axis acceleration sensor and a three-axis gyro (angular velocity) sensor. The six-axis sensor 111 may be an inertial measurement unit (IMU) with the sensors, described above, formed into a module.

The magnetic sensor 113 is a three-axis geomagnetic sensor, for example.

The global positioning system (GPS) 115 includes a GPS antenna (not illustrated) and serves as a receiver configured to receive a radio signal transmitted from a GPS satellite. Based on a GPS signal, the GPS 115 detects or calculates coordinates of a present position of the controller 10.

The six-axis sensor 111, the magnetic sensor 113, and the GPS 115 output values to the main processor 125 in accordance with a sampling period specified beforehand. The six-axis sensor 111, the magnetic sensor 113, and the GPS 115 may each be configured to respond to a request from the main processor 125 to output a detected value to the main processor 125 at a timing specified by the main processor 125.

The communication unit 117 is a communication device configured to execute wireless communications with an external device. The communication unit 117 includes an antenna (not illustrated), a radio frequency (RF) circuit, a baseband circuit, and a communication control circuit, for example. The communication unit 117 may be a device integrated with an antenna, an RF circuit, a baseband circuit, and a communication control circuit, for example, or may be a communication module substrate mounted with various circuits.

The communication unit 117 uses any of communication methods, such as Wi-Fi (registered trade name), Worldwide Interoperability for Microwave Access (WiMAX, registered trade name), Bluetooth (registered trade name), Bluetooth Low Energy (BLE), Digital Enhanced Cordless Telecommunications (DECT), ZigBee (registered trade name), and Ultra-Wide Band (UWB).

The sound processing unit 180 is coupled to the audio connector 46 (FIG. 1), and is configured to accept and output sound signals, as well as to encode or decode sound signals. The sound processing unit 180 includes an analog/digital (A/D) converter configured to convert an analog sound signal into digital sound data and a digital/analog (D/A) converter configured to convert digital sound data into an analog sound signal.

The external memory interface 191 serves as an interface configured to be coupled with a portable memory device and includes an interface circuit and a memory card slot configured to be attached with a card-type recording medium to read data, for example.

The controller 10 is mounted with a vibrator 176. The vibrator 176 includes a motor (not illustrated) and an eccentric rotor (not illustrated), for example, and is controlled by the main processor 125 to generate vibration. For example, as the operating unit 170 is operated or the power supply to the HMD 100 is turned on or off, the vibrator 176 vibrates in a predetermined vibration pattern.

The interface (I/F) 197 couples the sensor hub 193 and the field programmable gate array (FPGA) 195 to the image display unit 20. The interface 197 operates as an input unit configured to accept a release code, such as a two-dimensional bar-code or a QR code, entered with the camera 61. The interface (I/F) 197 further operates as another input unit configured to accept imaging data of the camera 61. That is, the interface (I/F) 197 operates as the input unit configured to accept a bar-code, a QR code, a face image, or a retina pattern, as a release code. The components will be described later in detail.

The sensor hub 193 is configured to acquire detected values of the sensors included in the image display unit 20 and output the detected values to the main processor 125. The FPGA 195 is configured to process data to be transmitted and received between the main processor 125 and components of the image display unit 20, as well as to execute transmissions via the interface 197.

With the coupling cable 40 and wires (not illustrated) inside the image display unit 20, the controller 10 is separately coupled with the right display unit 22 and the left display unit 24.

The right display unit 22 includes an organic light emitting diode (OLED) unit 221 configured to emit imaging light. The imaging light emitted by the OLED unit 221 is guided to the right light-guiding plate 26 by an optical system including a lens group, for example. The left display unit 24 includes an OLED unit 241 configured to emit imaging light. The imaging light emitted by the OLED unit 241 is guided to the left light-guiding plate 28 by an optical system including a lens group, for example.

The OLED units 221 and 241 respectively include drive circuits configured to drive OLED panels. The OLED panels are light emission type display panels each including light-emitting elements arranged in a matrix and configured to emit red (R) color light, green (G) color light, and blue (B) color light, respectively, by organic electro-luminescence. The OLED panels each include a plurality of pixels each including an R element, a G element, and a B element arranged in a matrix, and are each configured to form an image. The drive circuits are controlled by the controller 150 to select and to power the light-emitting elements included in the OLED panels in order to cause the light-emitting elements included in the OLED panels to emit light. Therefore, imaging light of images formed by the OLED units 221 and 241 is guided by the right light-guiding plate 26 and the left light-guiding plate 28, and enters the right eye RE and the left eye LE.

The right display unit 22 includes a display unit substrate 210. The display unit substrate 210 is mounted with an interface (I/F) 211 coupled to the interface 197, a receiver (Rx) 213 configured to receive data entered from the controller 10 via the interface 211, and an electrically erasable programmable read only memory (EEPROM) 215. The interface 211 couples the receiver 213, the EEPROM 215, a temperature sensor 69, the camera 61, the illuminance sensor 65, and the LED indicator 67 to the controller 10.

The electrically erasable programmable read only memory (EEPROM) 215 is configured to store data in a manner readable by the main processor 125. The EEPROM 215 stores data about a light-emitting property and a display property of the OLED units 221 and 241 included in the image display unit 20, and data about a property of a sensor included in the right display unit 22 or the left display unit 24, for example. Specifically, the EEPROM 215 stores parameters regarding Gamma correction performed by the OLED units 221 and 241 and data used to compensate for detected values of the temperature sensor 69 and a temperature sensor 239, for example. The data is generated when the HMD 100 is inspected before shipping from a factory, and written into the EEPROM 215. After shipped, the main processor 125 can use the data in the EEPROM 215 for performing processing.

The camera 61, in accordance with a signal entered via the interface 211, captures an image, and outputs imaging data or a signal indicative of the result of imaging to the interface 211.

The illuminance sensor 65 is configured to output a detected value corresponding to an amount of received light (intensity of received light) to the interface 211. The LED indicator 67, in accordance with a signal to be entered via the interface 211, comes on or goes off.

The temperature sensor 69 is configured to detect a temperature and output a voltage value or a resistance value corresponding to the detected temperature, as a detected value, to the interface 211. The temperature sensor 69 is mounted on a rear face of the OLED panel included in the OLED unit 221 or a substrate mounted with the drive circuit configured to drive the OLED panel to detect a temperature of the OLED panel. When the OLED panel is mounted as an Si-OLED together with the drive circuit, for example, to form an integrated circuit on an integrated semiconductor chip, the temperature sensor 69 may be mounted on the semiconductor chip.

The receiver 213 is configured to receive data transmitted by the main processor 125 via the interface 211. Upon receiving image data via the interface 211, the receiver 213 outputs the received image data to the OLED unit 221.

The left display unit 24 includes a display unit substrate 230. The display unit substrate 230 is mounted with an interface (I/F) 231 coupled to the interface 197 and a receiver (Rx) 233 configured to receive data entered by the controller 10 via the interface 231. The display unit substrate 230 is further mounted with a six-axis sensor 235 and a magnetic sensor 237. The interface 231 couples the receiver 233, the six-axis sensor 235, the magnetic sensor 237, and the temperature sensor 239 to the controller 10.

The six-axis sensor 235 is an example of a motion sensor configured to detect a motion of the image display unit 20. The six-axis sensor 235 includes a three-axis acceleration sensor and a three-axis gyro sensor. The six-axis sensor 235 may be an inertial measurement unit (IMU) including the sensors, described above, formed into a module. The magnetic sensor 237 is a three-axis geomagnetic sensor, for example.

The temperature sensor 239 is configured to detect a temperature and output a voltage value or a resistance value corresponding to the detected temperature, as a detected value, to the interface 231. The temperature sensor 239 is mounted on a rear face of the OLED panel included in the OLED unit 241 or a substrate mounted with the drive circuit configured to drive the OLED panel to detect a temperature of the OLED panel. When the OLED panel is mounted as an Si-OLED together with the drive circuit, for example, to form an integrated circuit on an integrated semiconductor chip, the temperature sensor 239 may be mounted on the semiconductor chip.

The camera 61, the illuminance sensor 65, the temperature sensor 69, the six-axis sensor 235, the magnetic sensor 237, and the temperature sensor 239 are coupled to the sensor hub 193 of the controller 10.

The sensor hub 193 is configured to follow a control by the main processor 125 and set and initialize sampling periods of the sensors. Based on the sampling periods of the sensors, the sensor hub 193 supplies power to the sensors, transmits control data, and acquires detected values, for example. At a timing set beforehand, the sensor hub 193 outputs detected values of the sensors to the main processor 125. The sensor hub 193 may include a function of temporarily holding detected values of the sensors in conformity to a timing of output to the main processor 125. The sensor hub 193 may include a function of responding to a difference in signal format of output values of the sensors or in data format, converting data in a format into data in a unified data format, and outputting the converted data to the main processor 125. The sensor hub 193 follows a control by the main processor 125, turns on or off power to the LED indicator 67, and allows the LED indicator 67 to come on or blink at a timing when the camera 61 starts or ends image capturing.

The controller 10 includes a power supply unit 130 and is configured to operate with power supplied from the power supply unit 130. The power supply unit 130 includes a rechargeable battery 132 and a power supply control circuit 134 configured to detect a remaining amount of the battery 132 and control charging to the battery 132.

The USB controller 199 is configured to function as a USB device controller, establish a communication with a USB host device coupled to the USB connector 19, and perform data communications. In addition to the function of the USB device controller, the USB controller 199 may include a function of a USB host controller. The USB controller 199 operates as an "input unit" configured to accept an imaging condition.

Figure 3:
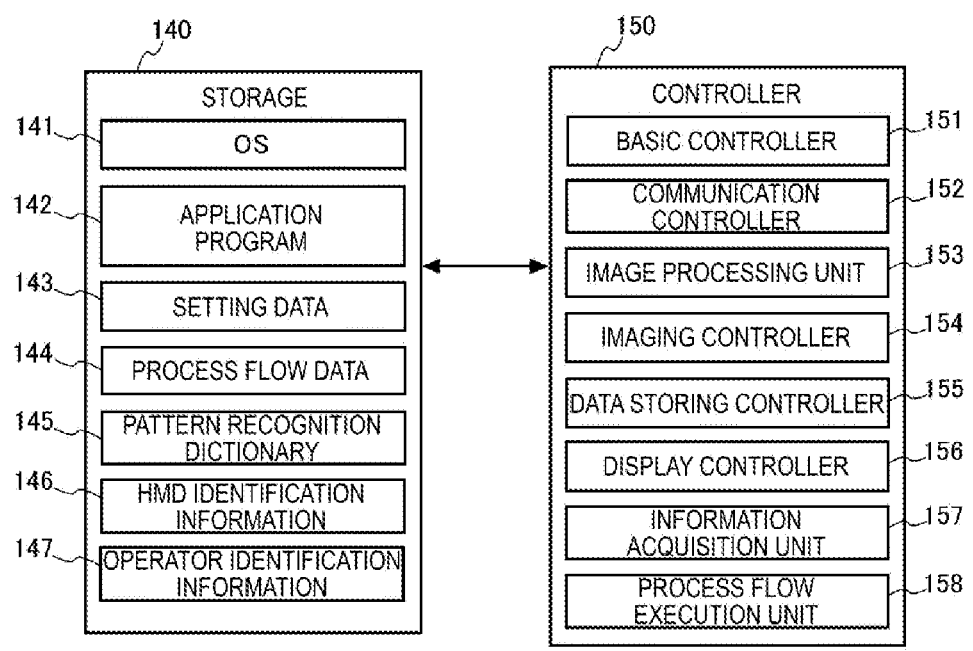
FIG. 3 is a functional block diagram of a controller.

FIG. 3 is a functional block diagram of a storage 140 and a controller 150 both configuring a control system of the controller 10 of the HMD 100. The storage 140 illustrated in FIG. 3 is a logical storage including the non-volatile storage 121 (FIG. 2) and may include the EEPROM 215. The controller 150 and various functional units included in the controller 150 are achieved when, as the main processor 125 executes a program, software and hardware work each other. The controller 150 and the functional units configuring the controller 150 are achieved with the main processor 125, the memory 118, and the non-volatile storage 121, for example.

The storage 140 is configured to store various programs to be executed by the main processor 125 and data to be processed with the programs. The storage 140 stores an operating system (OS) 141, an application program 142, setting data 143, process flow data 144, a pattern recognition dictionary 145, HMD identification information 146, and operator identification information 147.

The controller 150 executes the programs stored in the storage 140 and processes the data stored in the storage 140 to control the HMD 100.

The operating system 141 represents a basic control program for the HMD 100. The operating system 141 is executed by the main processor 125. As the power switch 18 is operated, and the power supply to the HMD 100 is turned on, the main processor 125 loads and executes the operating system 141. As the main processor 125 executes the operating system 141, various functions of the controller 150 are achieved. The functions of the controller 150 include a basic controller 151, a communication controller 152, an image processing unit 153, an imaging controller 154, a data storing controller 155, a display controller 156, an information acquisition unit 157, and a process flow execution unit 158.

The application program 142 is a program executed by the main processor 125 while the main processor 125 is executing the operating system 141. The application program 142 uses the various functions of the controller 150. In addition to the application program 142, the storage 140 may store a plurality of programs. For example, the application program 142 achieves functions, such as playing image contents, playing sound contents, gaming, capturing images with the camera, creating documents, web browsing, schedule administrating, telephony (including sound communications), image communication, and route navigation.

The setting data 143 includes various set values regarding operation of the HMD 100. The setting data 143 may include parameters, determinants, computing equations, look-up tables (LUTs), and the like used when the controller 150 controls the HMD 100.

The process flow data 144 represents data of a process flow created with an external device, such as a personal computer, and corresponds to "control data" according the invention. The controller 150 acquires data created with an external device, and causes the storage 140 to store the acquired data as the process flow data 144. The process flow data 144 may be general-purpose data executable by various devices including the HMD 100 (e.g., a device without the camera 61) and the HMD 100 with a different type or specification.

A process flow and the process flow data 144 will be described herein.

A process flow is a work flow representing an operation including a plurality of tasks. A process flow is a specific example of an "operation flow" according to the invention. A process flow includes a work block or a plurality of work blocks, and represents a sequence defined with an order of execution of the work blocks. The process flow further includes a step of outputting information to the operator U while the operator U performs tasks respectively set in the plurality of work blocks. A work block corresponds to an "operation step" according to the invention. A work block is handled as a unit when a process flow is created and edited. A work block may include a plurality of operations or processes.

The process flow data 144 represents data indicative of a work process for tasks to be performed by the operator U. The process flow data 144 includes work blocks included in the process flow, an order of execution of the work blocks, and setting contents set in the work blocks, and may include other information.

The pattern recognition dictionary 145 represents a dictionary registered with information identifying gestures. In the exemplary embodiment, a gesture denotes a motion or a shape of a hand set beforehand (hereinafter, it means a part from a wrist to a fingertip).

For example, an assumed gesture indicates moving a hand (left hand or right hand) from left to right. In this case, the pattern recognition dictionary 145 is registered with information indicative of a moving direction of the hand as information identifying the gesture. Another assumed gesture indicates opening of a closed palm, i.e., an operation of changing a shape of a palm from the closed palm to an open palm. In this case, the pattern recognition dictionary 145 is registered with information indicative of the shape pf the closed palm, information indicative of the shape of the open palm, and information indicative of an order of detection of the information indicative of the shapes.

The HMD identification information 146 represents identification information identifying the HMD 100 and may be a Media Access Control (MAC) address or an Internet Protocol (IP) address of the HMD 100, for example.

The operator identification information 147 represents information identifying the operator U performing operations with the HMD 100. When the HMD 100 is shared by a plurality of the operators U, the operators U should be identified. Therefore, when one of the operators U uses the HMD 100, the operator U enters the operator identification information 147, such as an ID and a password, via the operating unit 170. With the operator identification information 147 being accepted, the controller 150 authenticates the operator U, and starts a log-in process.

The basic controller 151 executes a basic function controlling the components of the HMD 100. When the power supply to the HMD 100 is turned on, the basic controller 151 executes a start process to initialize the components of the HMD 100. To turn off power to the controller 10, the basic controller 151 executes a shut-down process to end the process flow execution unit 158, update various data stored in the storage 140, and stop the HMD 100. In the shut-down process, power to the image display unit 20 also stops, wholly shutting down the HMD 100. The basic controller 151 includes a function of controlling power to be supplied from the power supply unit 130. With the shut-down process, the basic controller 151 separately turns off power supplied from the power supply unit 130 to each of the components of the HMD 100.

The communication controller 152 is configured to control the communication unit 117 to execute data communications with other devices. For example, the communication controller 152 receives, via the communication unit 117, content data supplied from an image supplying device (not illustrated), such as a personal computer, and causes the storage 140 to store the received content data.

The image processing unit 153 is configured to generate a signal to be transmitted to the right display unit 22 and the left display unit 24 based on image data or movie data to be displayed on the image display unit 20. Signals generated by the image processing unit 153 may be a vertical synchronizing signal, a horizontal synchronizing signal, a clock signal, an analog image signal, or the like. The image processing unit 153 may perform, as required, a resolution conversion process configured to convert the resolution of image data into a resolution appropriate for the right display unit 22 and the left display unit 24. The image processing unit 153 may execute an image adjustment process configured to adjust the brightness and saturation of image data and a 2D/3D conversion process configured to create 2D image data from 3D image data or generate 3D image data from 2D image data, for example. When one of the imaging processes is executed, the image processing unit 153 generates a signal for displaying an image based on the processed image data and transmits the signal to the image display unit 20.

The image processing unit 153 may be achieved when the main processor 125 executes the operating system 141 or may be separate hardware from the main processor 125. The hardware may be a digital signal processor (DSP), for example.

The imaging controller 154 is configured to control the camera 61. While the power supply to the HMD 100 is turned on, the imaging controller 154 causes the camera 61 to capture an image at a certain interval to generate imaging data. When the shutter button is pressed, the imaging controller 154 also causes the camera 61 to capture an image to generate imaging data. Imaging data of an image captured by the camera 61 is written into and temporarily stored in the memory 118. The memory 118 is a volatile memory. When the power supply to the HMD 100 is turned off, the imaging data written into the memory 118 disappears. The imaging controller 154 causes the memory 118 to overwrite and store imaging data generated at the certain interval. That is, when imaging data is written into a region of the memory 118, the region is overwritten with newly generated imaging data.

When the process flow execution unit 158 executes the process flow data 144, the data storing controller 155, in accordance with settings of the process flow data 144, allows or disallows use of imaging data. Each of the work blocks in the process flow data 144 includes denial information disallowing use of imaging data. To improve security, all work blocks can be set to disallow use of imaging data.

In the exemplary embodiment, the term "allow use" denotes that storing imaging data is allowed, i.e., the storage 140 is allowed to store imaging data temporarily stored in the memory 118. The term "allow use" also denotes allowing a process to use imaging data while the process flow data 144 is in execution or after the process flow data 144 is executed. In the exemplary embodiment, the term "disallow use" denotes that the storage 140 is disallowed to store imaging data temporarily stored in the memory 118. The term "disallow use" also denotes disallowing a process to use imaging data while the process flow data 144 is in execution or after the process flow data 144 is executed.

When a work block in the process flow data 144 is disallowed to use image data, and the process flow execution unit 158 is executing the work block, and when a condition set beforehand is satisfied, the data storing controller 155 allows use of the imaging data under a certain condition.

The operator U refers to an image or text indicative of a work procedure displayed on the image display unit 20 of the HMD 100 to perform tasks. When a trouble occurs during a task, and the trouble being occurred represents a trouble that requires imaging data to be recorded for identifying a cause of the trouble being occurred, the operator U asks an administrator—his or her manager—for allowing use of the imaging data. The administrator issues a release code to allow use of the imaging data. When a condition set beforehand is satisfied, i.e., when a release code is entered, for example, the data storing controller 155 allows use of the imaging data. That is, the storage 140 is allowed to store the imaging data.

A release code includes information, such as an administrator ID of an administrator, an upper limit value of an allowable count of use of imaging data (hereinafter referred to as an upper limit count), and an expiration period. The data storing controller 155 allows the storage 140 to store imaging data until a count of use reaches an upper limit count included in a release code. When one operation of the shutter button to allow the camera 61 to capture an image is counted to "1", the data storing controller 155 allows capturing of images until a count of use reaches an upper limit count. The storage 140 is allowed to store imaging data of the images captured in this time. An upper limit count corresponds to an "allowable number of times of use" according to the invention.

When a release code includes an expiration period, the data storing controller 155 allows capturing of images within the expiration period. The storage 140 is allowed to store imaging data of the images captured within the expiration period. For example, when a period from 3 PM to 6 PM, Apr. 30, 2018 is set as an expiration period, the data storing controller 155 allows the storage 140 to store imaging data of images captured within the expiration period.

A release code is also expressed by at least one of text information, image information, and biological information. A release code based on text information includes a barcode, for example. A release code based on image information includes a two-dimensional code, such as a QR code (registered trade name). A release code based on image information further includes a face image, a retina pattern, or a fingerprint of an administrator, for example.

A case when a condition set beforehand is satisfied includes a case when a gesture set beforehand is detected. The data storing controller 155 acquires, from the memory 118, imaging data of images captured continuously by the camera 61. The data storing controller 155 detects an image of a finger (e.g., index finger) performing a gesture from the images in the imaging data being acquired. The data storing controller 155 detects an image of a finger by performing a skin color extraction process or an edge detection process, for example. The data storing controller 155 acquires positional information (coordinates information) indicative of a position from the imaging data associated with the detected finger. The data storing controller 155 then identifies a motion from the acquired positional information about the finger. In the process, the motion can be identified based on the order of captured images of the detected finger in the imaging data and the detected positional information. The data storing controller 155 compares the motion of the detected finger and the information registered in the pattern recognition dictionary 145 to determine whether the motion of the detected finger and a gesture pattern registered in the pattern recognition dictionary 145 match each other.

When imaging data satisfies a condition set beforehand, i.e., an imaging condition set beforehand, use of imaging data may be allowed under a certain condition. Imaging conditions include at least any of a date and time of imaging, an imaging direction, an imaging angle, an imaging range, a location of imaging, an imaging order, an upper limit count, and a number of pixels.

A date and time of imaging sets an expiration period. Within the expiration period, capturing of images is allowed.

An imaging direction represents information specifying an imaging direction of the camera 61. An imaging angle represents information specifying an imaging angle of the camera 61. The data storing controller 155 uses a detected value of the six-axis sensor 235 to detect a direction (azimuth angle), an elevation angle, or a depression angle of the head of the operator U. As the data storing controller 155 detects an azimuth angle, an elevation angle, or a depression angle, the data storing controller 155 determines whether a direction of the detected azimuth angle, the detected elevation angle, or the detected depression angle corresponds to the imaging direction or a direction included in the imaging angle to determine whether use of imaging data is allowed.

An imaging range represents information indicative of a range allowing capturing of images. For example, when the operator U is assembling a printer, an imaging range may be set based on portions configuring the printer (e.g., parts including a paper discharge tray, for example, or information indicative of portions, such as a paper exit and a paper inlet), or may be set based on an angle of view.

A location of imaging represents information about a position allowing capturing of images. For example, when capturing of images is allowed only within a workroom, GPS information corresponding to the workroom is set. When positional information indicated by a GPS signal received by the GPS receiver 115 is included within a location of imaging, the data storing controller 155 allows use of imaging data.

An imaging order represents information specifying an order of capturing of images. For example, in an assumed case where, when imaging data entered continuously is image data of images of a product captured in an order of a top surface, a left side surface, and a right side surface, the imaging controller 154 allows the storage 140 to store the imaging data. In this case, the imaging order represents information indicative of the order of the captured images and information specifying imaging directions in the captured images in the order.

A number of pixels represents information set with a size (resolution) of imaging data.

The imaging conditions may be set per work block in the process flow data 144. A USB memory possessed by an administrator may be stored with an administrator ID and an imaging condition. When a trouble occurs, the administrator may couple the USB memory to the USB connector 19 of the HMD 100. The data storing controller 155 may read the imaging condition from the USB memory being coupled and allow the storage 140 to store imaging data of images captured so that the read imaging condition is satisfied.

The USB memory possessed by the administrator may be stored with 3D CAD data or imaging data generated to satisfy a set imaging condition. The data storing controller 155 reads the 3D CAD data or the imaging data from the USB memory being coupled and compares the read 3D CAD data or the read imaging data with imaging data of images captured by the camera 61 (matching). When the data storing controller 155 determines that imaging data of images captured by the camera 61 satisfies an imaging condition through matching, the data storing controller 155 allows storage 140 to store the imaging data.

The display controller 156 is configured to generate a control signal for controlling the right display unit 22 and the left display unit 24 and to control the generation and emission of the imaging light by each of the right display unit 22 and the left display unit 24. For example, the display controller 156 causes the OLED panels to display images to control timings when the OLED panels perform rendering, as well as to control brightness, for example. The display controller 156 controls the image display unit 20 to display an image on a display region. The display region represents a region the image display unit 20 can display an image.

The information acquisition unit 157 is configured to read data from an external device coupled via the external memory I/F 191 or the USB connector 19. When a storage device coupled to the external memory I/F 191 is detected, the information acquisition unit 157 reads data from the storage device, and causes the storage 140 to store the data, for example. The HMD 100 can thus read and use the process flow data 144 stored in the storage device.

The process flow execution unit 158 is configured to execute the application program 142 stored in the storage 140, and to further execute a process flow in accordance with the process flow data 144. The process flow data 144 includes at least work blocks included in the process flow, an order of execution of the work blocks, and setting contents set in the work blocks, respectively.

The setting contents set in the work blocks respectively include processes to be executed by the controller 150. The processes to be executed by the controller 150 include a process of displaying a screen containing images and text as information to an operator and reading of a two-dimensional code, such as a QR code. The processes to be executed by the controller 150 further include a process of accepting a text entry and accepting whether a work result is OK (acceptable) or NG (unacceptable). The processes to be executed by the controller 150 still further include accepting, as a work block, a selection entry using a check box, and accepting a selection entry using a radio button, for example.

The work blocks include at least a procedure display block, a reading block, an entry block, a determination block, a selection entry block, and an end block, for example.

A procedure display block represents a block configured to cause the image display unit 20 to display a screen or text indicative of a work procedure in the display region. An operator refers to the screen or the text caused to be displayed by the image display unit 20 in the display region to perform tasks.

A reading block represents a block configured to cause the camera 61 to capture an image to read from imaging data of the camera 61 a two-dimensional code, such as a QR code (registered trade name) or a bar-code.

The controller 150 implements display of a reading frame for two-dimensional code and a guidance display guiding an operator to allow a two-dimensional code to fall within the reading frame, for example. When an image of a two-dimensional code is detected within the reading frame, the controller 150 causes the storage 140 to store the image of the two-dimensional code being detected to analyze code information included in the two-dimensional code.

An entry block represents a block configured to cause the operating unit 170, for example, to accept an entry by an operator. A method for accepting an entry by an operator is not limited to the method using the operating unit 170. For example, a text recognition process using imaging data of the camera 61 and a sound recognition process for sound collected with the microphone 63 may be used to detect various entries including text. A bar-code reader may be coupled to the USB connector 19 to acquire data read from a bar-code to accept the data being acquired as an entry by an operator. A motion of an operator acquired from detected values of the six-axis sensors 235 and 111 may be accepted as an entry by an operator.

A determination block represents a block configured to accept a result of a finished task from an operator. An operator follows a work procedure displayed through the procedure display block to perform tasks, and then enters a work result of "OK (acceptable)" or "NG (unacceptable)", as the work result, through the operating unit 170, for example. When an entry of "OK (acceptable)" is accepted through the operating unit 170, the controller 150 makes a positive determination. In this case, the controller 150 executes a work block corresponding to the positive determination, such as executing the procedure display block to display a screen displayed with a next work content, for example. When an entry of "NG (unacceptable)" is accepted through the operating unit 170, the controller 150 makes a negative determination. In this case, the controller 150 executes a work block corresponding to the negative determination, such as displaying again the identical work content to cause the operator to perform the identical task, or causing the camera 61 to capture an image of a work result, for example.

A selection entry block represents a block configured to accept a selection entry using a check box or a radio button. When executing the selection entry block, the controller 150 causes a check box or a radio button to be displayed in a manner viewable by an operator to accept a selection in the check box or the radio button. Upon accepting a selection, the controller 150 executes a work block corresponding to the accepted selection.

An end block represents a block indicative of the end of the process flow.

The work blocks each include denial information disallowing use of imaging data. While a work block registered with denial information disallowing use of imaging data is in execution, the controller 150 disallows the storage 140 to store imaging data of images captured by the camera 61. To improve security, all work blocks may be set to disallow use of imaging data.

Figure 4:
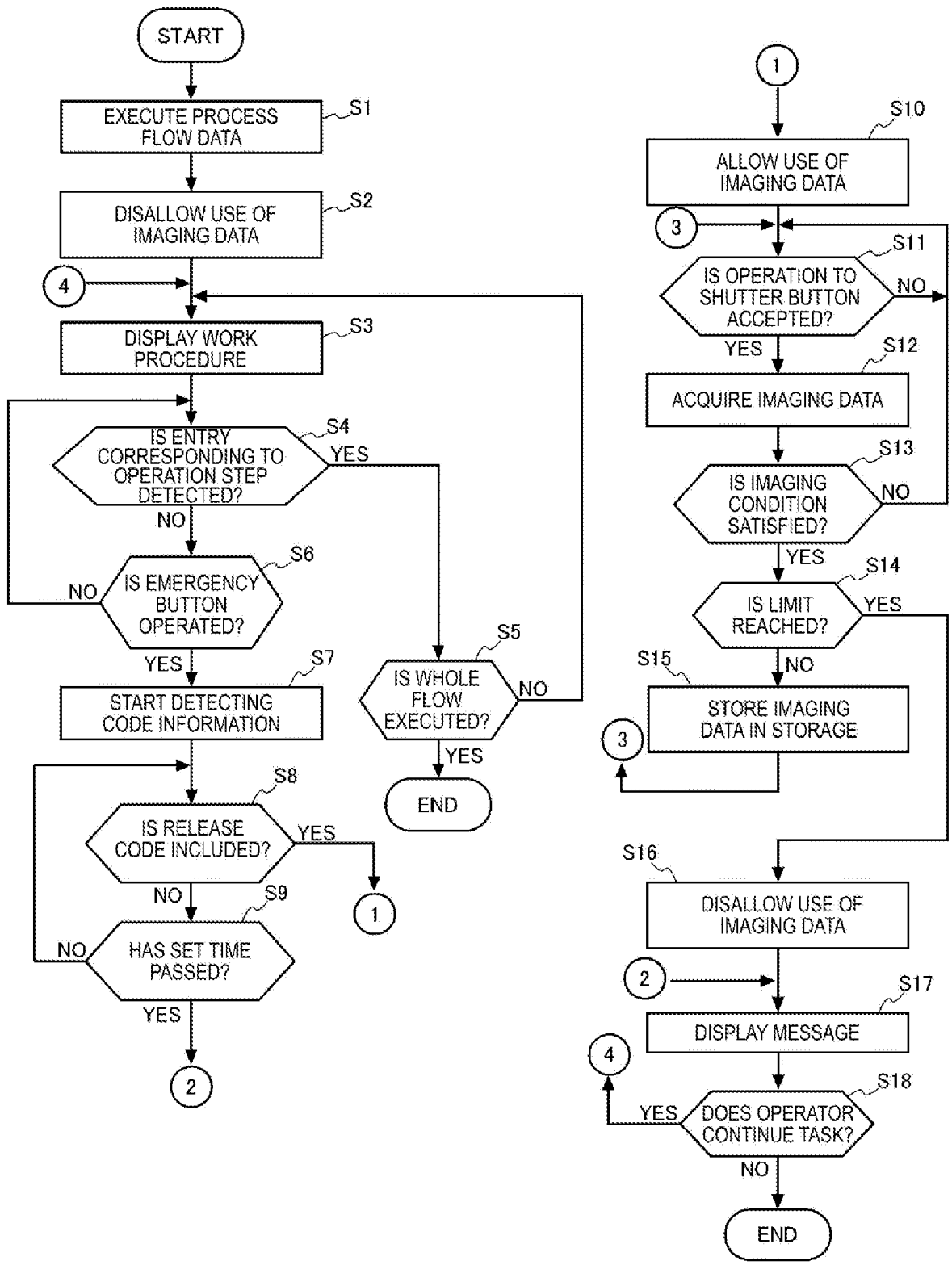
FIG. 4 is a flowchart illustrating an operation of the HMD.

FIG. 4 is a flowchart illustrating an operation of the HMD 100.

Before the operator U enters a workroom, the operator U wears the HMD 100, and operates the power switch 18 to turn on the power supply to the HMD 100. The operator U further operates the operating unit 170 to instruct the application program 142 to run. A case when the program 142 executing the process flow data 144 is selected as the application program 142 and the controller 150 is operable as the process flow execution unit 158, will be described herein.

After the controller 150 executes the application program 142 being selected, the controller 150, in accordance with the application program, reads the process flow data 144 from the storage 140, and executes the process flow data 144 (step S1). Next, the controller 150, in accordance with the process flow data 144, establishes a setting to disallow the use of imaging data (step S2). With the process flow data 144, whether use of imaging data is disallowed can be set per work block. However, here describes a case where use of imaging data is disallowed in all work blocks.

Next, the controller 150, in accordance with the process flow data 144, controls the image display unit 20, and allows the display region to display an image or text indicative of work procedures of operation steps included in the process flow (step S3).

Next, the controller 150 determines whether an entry corresponding to an operation step of a procedure being displayed is detected (step S4). When the controller 150 detects an entry corresponding to an operation step (step S4/YES), the controller 150 determines whether all of the processes of the process flow data 144 have been executed (step S5). When all of the processes have not yet been executed (step S5/NO), the controller 150 causes the process flow to return to step S3 and causes the display region to display an image or text of a next operation step. When all of the processes have been executed (step S5/YES), the controller 150 causes the process flow to end.

When the controller 150 does not detect an entry corresponding to an operation step (step S4/NO), the controller 150 determines whether an operation to an emergency button is accepted (step S6). The emergency button represents a software button caused by the controller 150 to be displayed in the display region, for example. The controller 150 detects a finger (e.g., index finger) of the operator U from imaging data of the camera 61 to determine whether a position of the finger in the detected imaging data and a position of the emergency button being displayed in the display region overlap with each other. The storage 140 stores calibration data including a position in a captured image in imaging data of the camera 61 and a position in the display region after these positions are associated with each other. When a trouble occurs while the operator U is performing a task in accordance with a work procedure, the operator U operates the emergency button, for example.

The operator U uses a fixed telephone provided in a workroom, for example, to notify the administrator that an emergency situation has occurred, for example. Upon notified with the emergency situation, the administrator visits the site of the trouble being occurred to determine whether the trouble should be recorded with an image. When the administrator determines that the trouble should be recorded, the administrator causes the operator U to capture a QR code possessed by the administrator with the camera 61 of the HMD 100. The QR code may be displayed on a screen of an administrator terminal 300 (see FIG. 5) used by the administrator, such as a smart phone or a tablet terminal, or may be printed on a sheet of paper beforehand, for example.

A QR code includes a release code allowing use of imaging data. A QR code further includes an expiration period and an upper limit count representing a number of times imaging data can be stored in the storage 140.

Figure 5:
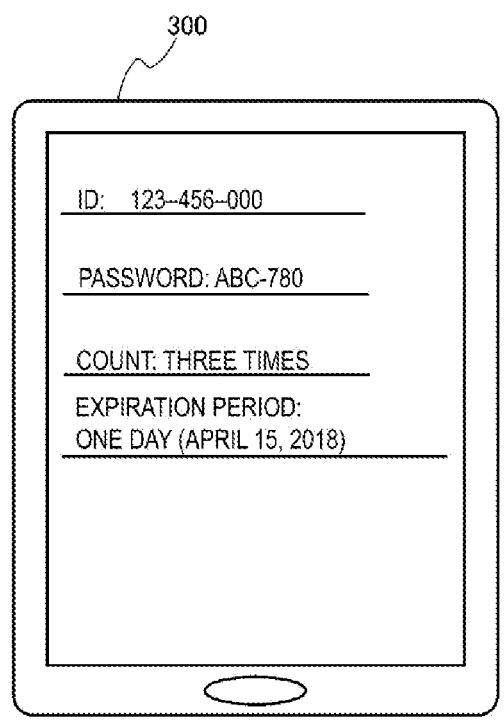
FIG. 5 is a view illustrating a display screen of an administrator terminal.

FIG. 5 is a view illustrating the screen of the administrator terminal 300.

The administrator terminal 300 used by the administrator is installed with an application program including a function of creating a QR code. The administrator enters, into the administrator terminal 300, information including the administrator ID, the password, the expiration period, and the upper limit count representing a number of times imaging data can be stored in the storage 140. A controller (not illustrated) of the administrator terminal 300 executes the application program. The controller generates a QR code including the information entered and served as code information.

When the emergency button is not operated (step S6/NO), the controller 150 causes the process flow to return to step S4 and determines whether an entry corresponding to an operation step is detected. When the emergency button is operated (step S6/YES), the controller 150 acquires imaging data of the camera 61 from the memory 118 and determines whether the imaging data being acquired includes code information. That is, the controller 150 starts detecting code information (step S7).

When the controller 150 detects code information from the imaging data, the controller 150 determines whether the code information includes a release code (step S8). When the code information includes no release code (step S8/NO), the controller 150 determines whether an elapsed time after the emergency button is operated exceeds a set time (step S9). When the elapsed time has not yet reached the set time (step S9/NO), the controller 150 causes the process flow to return to step S8 in order to make a determination. When the elapsed time has reached the set time (step S9/YES), the controller 150 causes the display region to display a message of asking whether the operator U continues a task (step S17). The controller 150 waits for an entry of whether the operator U continues the task. When the controller 150 accepts, via the operating unit 170, an operation of continuing the task (step S18/YES), the controller 150 causes the process flow to restart from step S3. When the controller 150 accepts, via the operating unit 170, an operation of ending the task (step S18/NO), the controller 150 causes the process flow to end.

When the code information includes a release code (step S8/YES), the controller 150 allows use of imaging data (step S10). Next, the controller 150 determines whether an operation to the shutter button is accepted (step S11). When the controller 150 accepts no operation to the shutter button (step S11/NO), the controller 150 waits for an operation to the shutter button. When the controller 150 accepts an operation to the shutter button (step S11/YES), the controller 150 instructs the camera 61 to capture an image and acquires imaging data of the image being captured (step S12).

Next, the controller 150 determines whether the imaging data being acquired satisfies an imaging condition (step S13). For example, the controller 150 reads an imaging condition or 3D CAD data or imaging data generated in accordance with an imaging condition from a USB memory coupled to the USB connector 19. In this flow, a case when imaging data is stored in a USB memory and the controller 150 reads the imaging data from the USB memory will be described. Imaging data read from a USB memory will be hereinafter referred to as sample image data 350 (see FIG. 6). The sample image data 350 represents image data of an image captured to satisfy a set imaging condition (an imaging direction, an imaging angle, and an imaging range).

Figure 6:
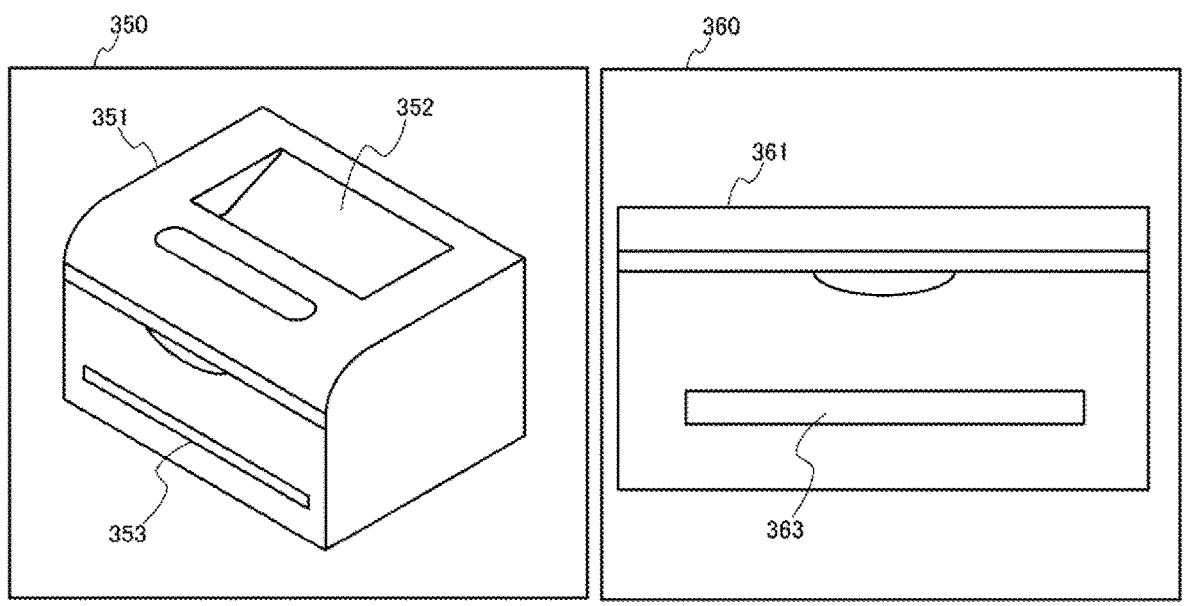
FIG. 6 is a view illustrating sample image data and imaging data.

FIG. 6 illustrates the sample image data 350 and imaging data 360 of an image captured by the camera 61.

After the sample image data 350 is acquired from a USB memory, the controller 150 performs matching on the imaging data 360 of the camera 61. The controller 150 determines whether an imaging direction, an imaging angle, and an imaging range of the imaging data 360 and an imaging direction, an imaging angle, and an imaging range of the sample image data 350 match each other, and determines whether the imaging condition is satisfied (step S13).

In the sample image data 350 illustrated in FIG. 6, an image of a printer 351 is captured. In the imaging data 361, an image of a printer 361 is captured.

The printer 351 in the captured image of the sample image data 350 includes a paper inlet 352. On the other hand, the printer 361 in the captured image of the imaging data 360 includes no paper inlet. The controller 150 identifies portions of the printers 351 and 361 in the captured images of the sample image data 350 and the imaging data 360, respectively. When the controller 150 has found that a portion of the printer 351 (361) in the captured image of the sample image data 350 is not included in the printer 361 in the captured image of the imaging data 361, the controller 150 disallows the storage 140 to store the imaging data. On the other hand, when the controller 150 has found that a portion of the printer 361 (351) in the captured image of the imaging data 360 is not included in the printer 351 in the captured image of the sample image data 350, the controller 150 disallows the storage 140 to store the imaging data.

When an imaging angle of a portion included in the printer 351 and an imaging angle of a corresponding portion included in the printer 361 differ from each other, the controller 150 disallows the storage 140 to store the imaging data 360.

For example, a paper exit 353 of the printer 351 in the captured image of the sample image data 350 illustrated in FIG. 6 is not in parallel to a lateral direction of the sample image data 350. On the other hand, a paper exit 363 of the printer 361 in the captured image of the imaging data 360 is in parallel to the lateral direction of the imaging data 360. The controller 150 determines whether imaging angles of respective portions configuring the printers match each other, and determines whether controller 150 allows the storage 140 to store imaging data.

When the imaging data of the camera 61 does not satisfy the imaging condition (step S13/NO), the controller 150 causes the process flow to return to step S11 and waits for an operation to the shutter button. When the imaging data of the camera 61 satisfies the imaging condition (step S13/YES), the controller 150 determines whether the upper limit count or the expiration period, for example, has been reached (step S14). The controller 150 determines whether a number of times imaging data is stored in the storage 140 exceeds the upper limit count. The controller 150 determines whether the expiration period has ended. When the controller 150 determines that any of the limits has been reached (step S14/YES), the controller 150 disallows the storage 140 to store imaging data. After that, the controller 150 causes the process flow to proceed to step S16. When the controller 150 determines that none of the limits has been reached (step S14/NO), the controller 150 allows the storage 140 to store imaging data (step S15). The controller 150 then causes the process flow to return to step S11.

In step S16, the controller 150 establishes a setting to disallow the use of imaging data and causes the display region to display a message of asking whether the operator U continues a task (step S17). When the controller 150 accepts, via the operating unit 170, an operation of continuing the task (step S18/YES), the controller 150 causes the process flow to restart from step S3. When the controller 150 accepts, via the operating unit 170, an operation of ending the task (step S18/NO), the controller 150 causes the process flow to end.

As described above, the camera 61 captures an image of a QR code. The QR code is detected from the captured image in imaging data. Use of the imaging data is thus allowed. A method of entering a release code is not limited to a method based on a QR code, but may be a method based on another two-dimensional code, such as a marker or a bar-code. In a case where the storage 140 is allowed to store imaging data by identifying an administrator, a configuration using face authentication or fingerprint authentication may be applied, or an integrated circuit (IC) card possessed by the administrator may be read. The storage 140 may be allowed to store an image of an object identifying an administrator, such as arm band, watch, or eyeglasses, and, when an image of an object extracted from imaging data and the image stored in the storage 140 match each other, the storage 140 may be allowed to store the imaging data.

As described above, the HMD 100 according to the first exemplary embodiment includes the storage 140, the camera 61 serving as an input unit and an imaging unit, and the controller 150.

The storage 140 is configured to store the process flow data 144 defining an operation flow including a plurality of operation steps predetermined with an order of execution. At least some of work blocks included in the process flow data 144 respectively include settings of whether use of imaging data of the camera 61 is allowed.

The controller 150 follows the order of execution, executes the plurality of work blocks included in the process flow data 144, and, in accordance with the settings of the process flow data 144 regarding the work blocks, controls whether the controller 150 allows use of imaging data.

When an operation step is disallowed to use imaging data of the camera 61, and the controller 150 executes the operation step, and when a release code is detected from the imaging data, the controller 150 allows use of the imaging data. When a condition set beforehand is satisfied through use of imaging data, the controller 150 disallows use of the imaging data of the camera 61.

Therefore, when a work block in the process flow data 144 is disallowed to capture an image, and the work block is executed, and when a release code is detected, use of imaging data is allowed, improving convenience of the HMD 100, while maintaining security. When the condition set beforehand is satisfied, use of imaging data of the imaging unit is disallowed, thus security can be maintained.

When a release code is detected from imaging data, and use of imaging data is allowed, the controller 150 allows the storage 140 to store imaging data satisfying an imaging condition being entered into the USB controller 199 serving as an input unit.

With this configuration, imaging data satisfying an imaging condition can only be stored in the storage 140.

An imaging condition includes at least one of a date and time of imaging, a location of imaging, an order of imaging, a number of images to be captured at a single location of imaging, an angle of view, and a number of pixels.

Therefore, a date and time of imaging, a location of imaging, an order of imaging, a number of images to be captured at a single location of imaging, an angle of view, and a number of pixels of imaging data to be stored in the storage 140 can be set.

A release code is expressed with at least one of text information, image information, and biological information.

Therefore, text information, image information, and biological information can be used as a release code.

The operating unit 170 configured to operate as an input unit accepts an entry of a password as text information. The camera 61 configured to operate as an input unit accepts, as a release code, one of entries of a bar-code, a two-dimensional bar-code, and a QR code serving as a release code, and a face image, a retina pattern, and a fingerprint serving as biological information.

Therefore, one of a password, a bar-code, a two-dimensional bar-code, a QR code, a face image, a retina pattern, and a fingerprint can be used as a release code.

The controller 150 extracts code information from imaging data of the camera 61 and, when the extracted code information includes a release code, allows use of the imaging data. The controller 150 further determines an upper limit count for the imaging data based on the extracted code information, uses the determined upper limit count serving as an upper limit, and allows use of the imaging data until a count of use reaches the upper limit.

Therefore, an upper limit count included in code information can be used as an upper limit, and use of imaging data is allowed until a count of use reaches the upper limit.

The controller 150 further detects a gesture from imaging data of the camera 61 and, when the detected gesture and a gesture registered as a release code set beforehand match each other, the controller 150 allows use of the imaging data.

Therefore, without operating the operating unit, use of imaging data is allowed with a simple operation.

Second Exemplary Embodiment

Figure 7:
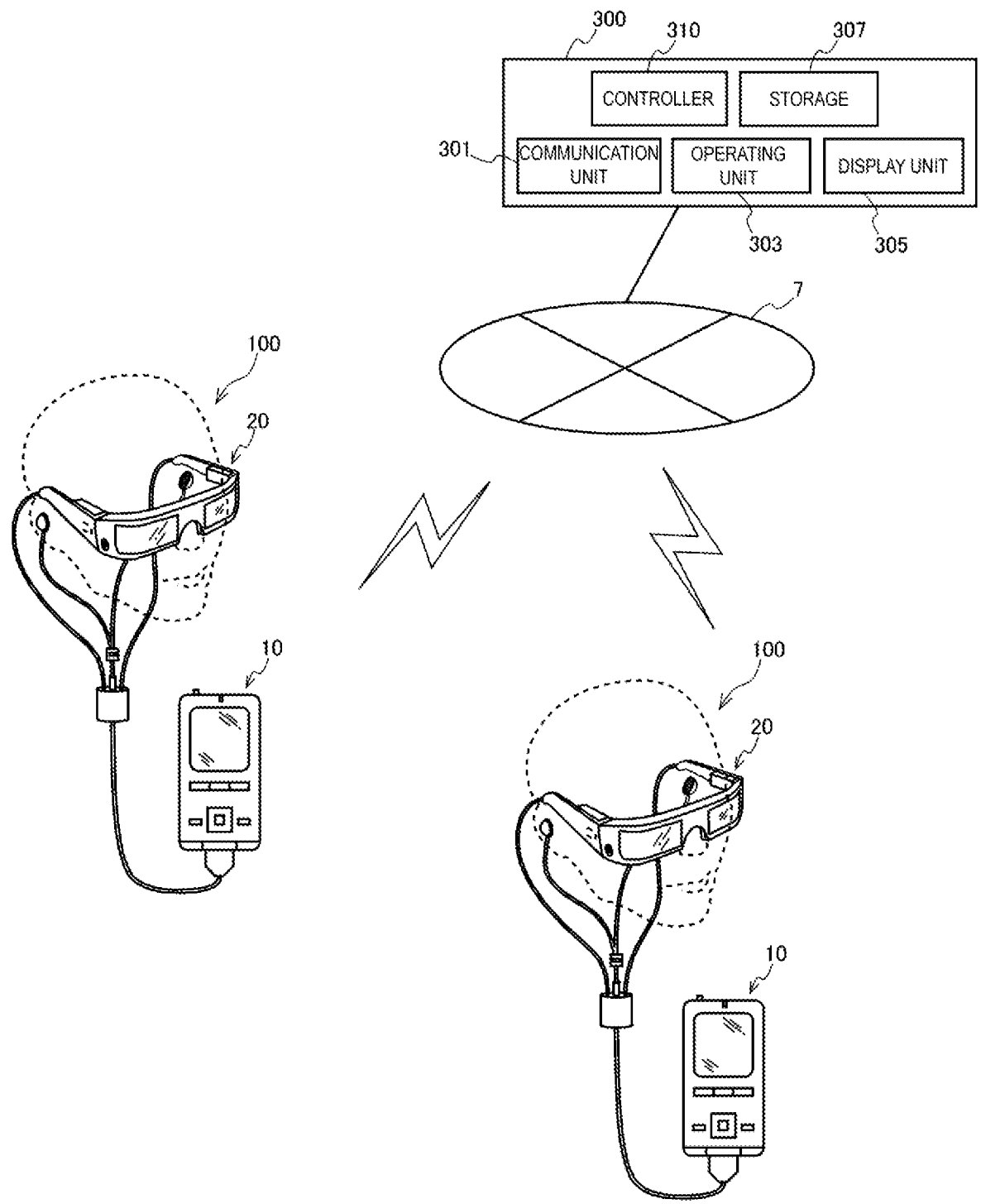
FIG. 7 is a view illustrating a system configuration.

Next, a second exemplary embodiment of the invention will be described with reference to the accompanying drawings. FIG. 7 is a view illustrating a system configuration of the second exemplary embodiment. The exemplary embodiment has a configuration where the HMD 100 and the administrator terminal 300 are coupled via a network 7. The administrator terminal 300 operates as "information processing device" according to the invention. The HMD 100 is coupled to the network 7 via a wireless access point and is configured to perform data communications with the administrator terminal 300, for example.

The administrator terminal 300 represents a terminal used by an administrator administrating a plurality of the operators U. When a trouble occurs while one of the operators U is performing a task, the operator U uses the HMD 100 to transmit a notification, to the administrator terminal 300, of the trouble being occurred. Upon the administrator receives the notification of the trouble being occurred from the HMD 100, the administrator determines whether the trouble being occurred should be recorded in an image. When the administrator determines that the trouble should be recorded in an image, the administrator transmits, to the HMD 100, instruction information including a release code.

The administrator terminal 300 includes a communication unit 301, an operating unit 303, a display unit 305, a storage 307, and a controller 310.

The communication unit 301 is coupled to the network 7 and configured to perform data communications with another device coupled to the network 7.

The operating unit 303 includes an input device configured to accept an operation. The display unit 305 represents a display device, such as a liquid crystal display (LCD). The storage 307 is configured to store control programs to be executed by the controller 310. The storage 307 further stores identification information of the HMD 100 being registered and the operator identification information 147 identifying the operators U. The controller 310 executes the control programs to control components of the administrator terminal 300.

Figure 8:
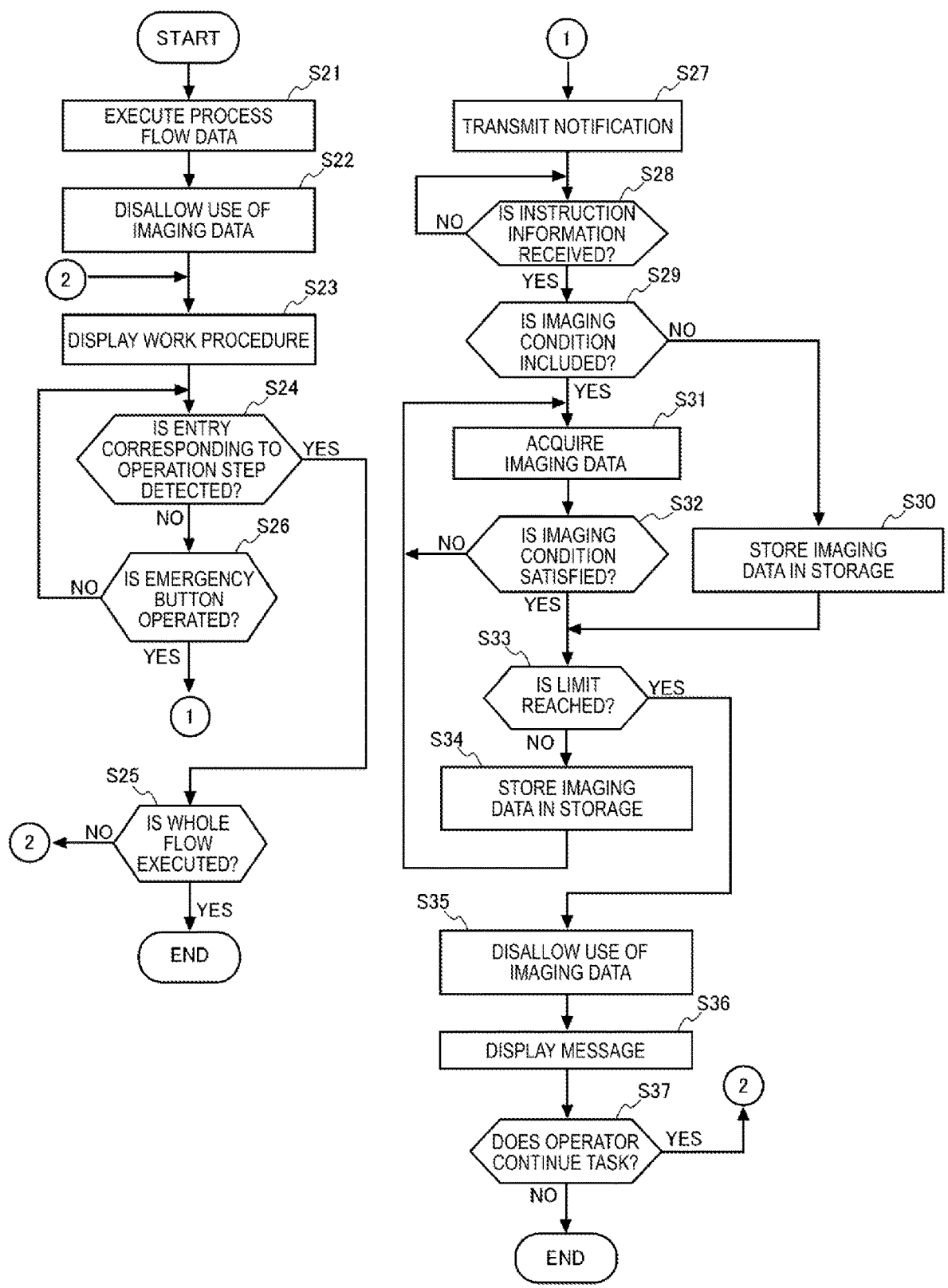
FIG. 8 is a flowchart illustrating an operation of the HMD.

FIG. 8 is a flowchart illustrating an operation of the HMD 100 according to the second exemplary embodiment.

In the flowchart illustrated in FIG. 8, operations in the steps S21 to S26 are identical to operations in the steps S1 to S6 in the flowchart illustrated in FIG. 4 and are not described.

When the controller 150 determines that the emergency button is operated (step S26/YES), the controller 150 notifies the administrator terminal 300 coupled to the network 7 that a trouble has occurred (step S27). The notification may be sent with an e-mail, for example. The notification includes an operation step involving the trouble being occurred, a date and time of occurrence of the trouble, the HMD identification information 146, and the operator identification information 147, for example. The operator U can describe details of the trouble, generate a document (text data) by using the operating unit 170, and include the generated text data in a notification.

Upon the administrator terminal 300 receives the notification from the HMD 100, the administrator causes the display unit 305 to display the details of the received notification. Based on the details of the notification displayed on the display unit 305, the administrator determines whether the trouble being occurred should be recorded in an image. When the administrator determines that the trouble should be recorded in an image, the administrator operates the operating unit 303 to set an imaging condition. An imaging condition represents a condition allowing capturing of an image of a product involving the trouble being occurred and includes information, such as an upper limit count, an expiration period, a portion of imaging, an imaging direction, an imaging angle, an imaging range, and a location of imaging. The administrator transmits, to the HMD 100 in question, instruction information including the administrator ID and the set imaging condition. Here describes a case when this flow transmits, to the HMD 100, instruction information including the sample image data 350 captured in an image under the set imaging condition.

After the controller 150 transmits a notification, the controller 150 waits for instruction information (step S28). Upon receiving instruction information (step S28/YES), the controller 150 determines whether the received instruction information includes an imaging condition (step S29). In this flow, the controller 150 determines whether the sample image data 350 captured in an image under an imaging condition is included. When the instruction information includes no imaging condition (step S29/NO), the controller 150, in accordance with an operation to the shutter button performed by the operator U, causes the camera 61 to capture an image. The controller 150 causes the storage 140 to store generated imaging data (step S30) and causes the process flow to proceed to step S33 for making a determination.

When the instruction information includes an imaging condition (step S29/YES), the controller 150, in accordance with an operation to the shutter button, acquires the generated imaging data (step S31). After that, the controller 150 determines whether the imaging data being acquired satisfies the imaging condition (step S32). As described in FIG. 6, the controller 150 determines whether an imaging direction, an imaging angle, and an imaging range of the imaging data and an imaging direction, an imaging angle, and an imaging range of the sample image data 350 match each other, and determines whether the imaging data satisfies the imaging condition. When the imaging data being acquired does not satisfy the imaging condition (step S32/NO), the controller 150 disallows the storage 140 to store the imaging data. In this case, the controller 150 causes the process flow to return to step S31 and acquires next imaging data.

When the imaging data being acquired satisfies the imaging condition (step S32/YES), the controller 150 determines whether an upper limit count or an expiration period, for example, has been reached (step S33). When the controller 150 determines that one of the limits has been reached (step S33/YES), the controller 150 disallows the storage 140 to store the imaging data and causes the process flow to proceed to step S35. When the controller 150 determines that none of the limits has been reached (step S33/NO), the controller 150 allows the storage 140 to store the imaging data (step S34) and causes the process flow to proceed to step S31.

When the controller 150 determines that one of the limits has been reached in step S33 (step S33/YES), the controller 150 establishes a setting to disallow the use of imaging data (step S35) and causes the display region to display a message of asking whether the operator U continues a task (step S36). Upon accepting, via the operating unit 170, an operation of continuing the task (step S37/YES), the controller 150 causes the process flow to restart from step S23. Upon accepting, via the operating unit 170, an operation of ending the task (step S37/NO), the controller 150 causes the process flow to end.

As described above, the HMD 100 according to the second exemplary embodiment accepts as an entry a release code received from the administrator terminal 300 by the communication unit 117. When the accepted release code and a release code set beforehand match each other, the controller 150 allows use of imaging data. Therefore, an administrator can operate the administrator terminal 300. The HMD 100 is thus allowed to use imaging data.

The exemplary embodiments described above are preferable exemplary embodiments of the invention. However, the invention is not limited to the exemplary embodiments. The invention can include various modified examples within the scope of the invention without departing from the gist of the invention.

For example, the HMD 100 may include an interface (not illustrated) configured to couple various kinds of external device configured to supply content. For example, an interface conforming to wired coupling, such as a USB interface, a micro USB interface, or a memory card interface, or a wireless communication interface may be used. An external device in this case serves as an image supplying device configured to supply images to the HMD 100 and may be a personal computer (PC), a cellular phone terminal, or a portable gaming device, for example. In this case, the HMD 100 can output an image or sound based on content data to be entered from the external device described above.

In the exemplary embodiments described above, the controller 10 is configured to be wire-coupled with the image display unit 20. However, the invention is not limited to this coupling style. In the invention, the image display unit 20 may be wireless-coupled to the controller 10. A wireless communication method in this case may be a method exemplified as a communication method supported by the communication unit 117 or may be another communication method.

Some of the functions included in the controller 10 may be provided to the image display unit 20. The controller 10 may otherwise be achieved by a plurality of devices. That is, the controller 10 may not have a box-shaped case. For example, instead of the controller 10, a device that can be attached to the body or cloth of the operator U or wearable device by the operator U may be used. A wearable device by the operator U may be a wrist watch type device, a ring type device, a laser pointer, a mouse, an air mouse, a gaming controller, or a pen type device, for example.

Further, in the exemplary embodiments described above, the image display unit 20 and the controller 10 separated from each other are coupled via the coupling cable 40. The invention is not limited to the configuration. The controller 10 and the image display unit 20 integrated with each other may be worn on a user's head.

The controller 10 may be a laptop computer, a tablet computer, or a desktop computer. The controller 10 may be a portable electronic device, such as a gaming device, a cellular phone, a smart phone, or a portable media player, or another special device, for example.

For example, instead of the image display unit 20, an image display unit in another style may be adopted, such as a cap style image display unit. Such an image display unit in another style may at least include a display unit configured to display an image corresponding to the left eye LE of the operator U and a display unit configured to display an image corresponding to the right eye RE of the operator U. Instead of the image display unit 20, a head-up display may be used that can be mounted on a vehicle, such as a car or an airplane, for example. For example, when a head-up display is mounted on a vehicle, an operation face corresponding to the operation face of the operation pad 14 may be provided to a steering wheel of the vehicle, for example.

For example, a head-mounted display apparatus built into a body protector, such as a helmet, may be used. In this case, a positioning portion may be at a position of the body of the operator U and an attaching portion may be attached to the position of the body of the operator U.

In the configuration described above as an example optical system configured to guide imaging light to the eyes of the operator U, virtual images are formed by the half mirrors 261 and 281 on areas of the right light-guiding plate 26 and the left light-guiding plate 28. The invention is not limited to the configuration. A configuration may be adopted that an image is displayed onto a display region occupying most of or full of the right light-guiding plate 26 and the left light-guiding plate 28. In this case, in an operation of changing how an image is displayed, the image may be reduced in size.

Further, the optical elements of the invention are not limited to the right light-guiding plate 26 and the left light-guiding plate 28 respectively including the half mirrors 261 and 281, but may be optical components configured to allow imaging light to enter the eyes of the operator U. Specifically, a diffraction grating, a prism, or a holography display unit may be used.

A configuration may be adopted that at least some of the functional blocks illustrated in FIGS. 2 and 3 are achieved with hardware or achieved with hardware and software. The invention is not limited to a configuration in which separate hardware resources are arranged as illustrated in the drawings. Programs to be executed by the controller 150 may be stored in the non-volatile storage 121 or another storage (not illustrated) in the controller 10. A configuration may be adopted in which a program to be executed is stored in an external device and acquired via the communication unit 117 or the USB connector 19. In the configuration formed in the controller 10, the operating unit 170 may be formed as an interface (user interface or UI).

The flowcharts illustrated in FIGS. 4 and 8 are divided in accordance with primary processing details for easily understanding a process of the controller 150 of the HMD 100. However, the invention is not limited by a name or a method of dividing the flowcharts. A process of the controller 150 may be further divided in accordance with processing details. Each of processing units may be further divided to include more tasks. Orders in the flowcharts described above are not limited to the orders in the illustrated examples.

To achieve the method for controlling the head-mounted display apparatus, according to the invention, with a computer including a display apparatus, the invention may be such an aspect that includes a program to be executed by the computer to achieve the control method described above and a recording medium recorded with the program to be readable by the computer or a transmission medium configured to transmit the program. The recording medium described above may be a magnetic recording medium, an optical recording medium, or a semiconductor memory device. Specifically, the recording medium described above may be a portable or fixed recording medium, such as a flexible disk, a hard disk drive (HDD), a compact disk read only memory (CD-ROM), a digital versatile disk (DVD), a Blu-ray (registered trademark) disc, a magneto-optical disk, a flash memory, or a card-type recording medium. The recording medium described above may be a non-volatile storage, such as a random access memory (RAM), a read only memory (ROM), and a hard disk drive (HDD) all representing internal storages included in an image display apparatus.

The entire disclosure of Japanese Patent Application No.: 2018-009519, filed Jan. 24, 2018 is expressly incorporated by reference herein.

What is claimed is:

1. A head-mounted display apparatus to be worn on a user's head, the head-mounted display apparatus comprising:
an input unit configured to accept an entry;
an imaging unit configured to capture an image of outside scenery;
a storage configured to store control data defining an operation flow including a plurality of operation steps performed by the user for which an order of execution is predetermined the operation flow including a step of displaying a screen containing images and text as information to the user while the user performs tasks set in the plurality of operation steps, and a step of accepting whether a work result is acceptable or unacceptable, at least any of the operation steps, which is included in the control data, including settings of whether use of imaging data of the imaging unit is allowed; and
a controller configured to
follow the order of execution,
execute the plurality of operation steps included in the control data, and
in accordance with the settings in the control data regarding the operation steps, control whether the use of the imaging data is allowed,
wherein,
when one of the operation steps is disallowed to use the imaging data of the imaging unit, and the one of the operation steps is executed, and when a release code is entered through the input unit, the controller allows use of the imaging data, and,
when the imaging data is used and as a result of the controller determining that a condition set beforehand is satisfied, the controller disallows use of the imaging data of the imaging units
when the release code is entered through the input unit, and when the controller allows use of the imaging data, the controller causes the storage to store the imaging data satisfying an imaging condition entered through the input unit, and
the imaging condition includes at least one of (a) a date and time of imaging and (b) a number of images to be captured at a same location of imaging.

2. The head-mounted display apparatus according to claim 1, wherein
the input unit accepts the imaging data as an entry, and the controller
extracts code information from the imaging data accepted as the entry by the input unit,
when the code information being extracted includes the release code, allows use of the imaging data,
determines an allowable number of times of use of the imaging data based on the code information being extracted, and
sets the determined allowable number of times of use as an upper limit to allow use of the imaging data.

3. The head-mounted display apparatus according to claim 1, wherein
the input unit accepts the imaging data as an entry, and the controller
detects a gesture based on the imaging data accepted by the input unit, and, when the detected gesture corresponds to a gesture set beforehand and registered as a release code, allows use of the imaging data.

4. The head-mounted display apparatus according to claim 1, further comprising a communication unit, wherein the input unit accepts as an entry a release code received from an information processing device by the communication unit, and, when the release code accepted by the input unit corresponds to the release code set beforehand, the controller allows use of the imaging data.

5. The head-mounted display apparatus according to claim 1, wherein the release code uses at least one of text information, image information, and biological information.

6. The head-mounted display apparatus according to claim 5, wherein the input unit accepts one of a password serving as the text information, a bar-code, a two-dimensional bar-code, and a QR code serving as the image information, and a face image, a retina pattern, and a fingerprint serving as the biological information as an entry of the release code.

7. A method for controlling a head-mounted display apparatus to be worn on a user's head, the head-mounted display apparatus including:

a storage configured to store control data defining an operation flow including a plurality of operation steps performed by the user for which an order of execution is predetermined the operation flow including a step of displaying a screen containing images and text as information to the user while the user performs tasks set in the plurality of operation steps, and a step of accepting whether a work result is acceptable or unacceptable, at least any of the operation steps, which is included in the control data, including settings of whether use of imaging data of the imaging unit is allowed;

an imaging unit configured to capture an image of outside scenery, the method comprising:

following the order of execution, executing the plurality of operation steps included in the control data, and in accordance with the settings in the control data regarding the operation steps, controlling whether the use of the imaging data is allowed, when one of the operation steps is disallowed to use the imaging data of the imaging unit, and the one of the operation steps is executed, and when a release code is entered, allowing use of the imaging data, when the imaging data is used and as a result, a condition set beforehand in the control data is satisfied, disallowing use of the imaging data of the imaging unit, when the release code is entered through the input unit, and when use of the imaging data is allowed, causing the storage to store the imaging data satisfying an imaging condition entered through the input unit, and the imaging condition includes a number of images to be captured at a same location of imaging.

* * * * *